Oct. 17, 1967     NAOTARO OKZAKI     3,346,919

METHOD AND APPARATUS FOR VENTING OF SCREW EXTRUDER

Filed Jan. 10, 1966

United States Patent Office 3,346,919
Patented Oct. 17, 1967

3,346,919
METHOD AND APPARATUS FOR VENTING OF SCREW EXTRUDER
Naotaro Okzaki, 72 Hakuraku, Kanagawa-ku, Yokohama-shi, Japan
Filed Jan. 10, 1966, Ser. No. 519,752
4 Claims. (Cl. 18—12)

ABSTRACT OF THE DISCLOSURE

Venting apparatus for an extruder system having a venting passage between a first extruder and a second extruder with a breaker plate at the inlet of said venting passage for dividing the material as it enters the passage, the breaker plate being tapered in thickness so that the material passing through the venting passage is uniformly distributed over the entire surface of the breaker plate, the passage being subjected to a vacuum whereby the material passing therethrough is degassed.

---

This invention relates to improvements for the venting of a screw extruder for rubber and plastics.

Conventional vent systems now in wide use are mostly of the type in which a section of small root diameter is provided midway of the length of extruder screw thereby to cause a sharp drop in the pressure of the material being extruded, a vent hole being provided above the section of reduced root diameter so that occluded air, dissolved monomer, and other components of the material passing through the extruder, either gaseous or volatile, can be discharged out of the machine by means of a vacuum pump.

It is well known that vent systems of this type have various disadvantages as follows.

(1) Since formation of a screw section of reduced root diameter is tantamount to provision of a section which is not capable of extruding the material, it is impracticable to have the section of great length. Hence the residence time of the material in that section is very short and the vent is limited.

(2) In the above section, the material flows in the form of a ribbon helically around the screw root, and therefore the material is vented on the side of said ribbon facing the vent hole but is scarcely vented on the opposite side.

(3) In order to overcome the above difficulties and to provide a larger vent, it is necessary either to decrease the thickness of the ribbon or to slow down the extrusion rate so as to extend the dwell time of the material. As is well known such steps result in a substantial drop of output.

(4) Another serious disadvantage of the conventional system is that venting is not accomplished unless the stock pressures in the hopper side of the vent hole and in the opposite side are exactly balanced.

(5) According to a modified system, the vent hole is provided on the screw root, however, herein there is a possibility of the hole being clogged with the stock. Moreover, the system has an inevitable drawback that, in the case of small-diameter extruders, the vent hole prevents the use of a cooling or heating channel inside the screw.

(6) In a further modification, two cylinder portions separated by the vent section are placed into communication with each other by a bypass pipe so that the pressure in both portions may be adjusted to be balanced. However, this is not a practical system because it is very troublesome to clean the inside of the bypass pipe which becomes filled with stock.

These disadvantages of conventional systems shown above are attributable, without exception, to a fundamental error in design, that is, to an erroneous concept of venting midway of the length of extruder screw.

In the light of the above, the present invention has been perfected with a revolutionary design based on a unique concept. It eliminates all of the above mentioned disadvantages.

According to the invention, the venting is effected at the outlet end of the extruder through a vertical passage subjected to a vacuum, the material being divided into fine cords before introduction into the vertical passage.

Now the invention will be described in more detail with reference to the accompanying drawings, in which.

Figure 1:
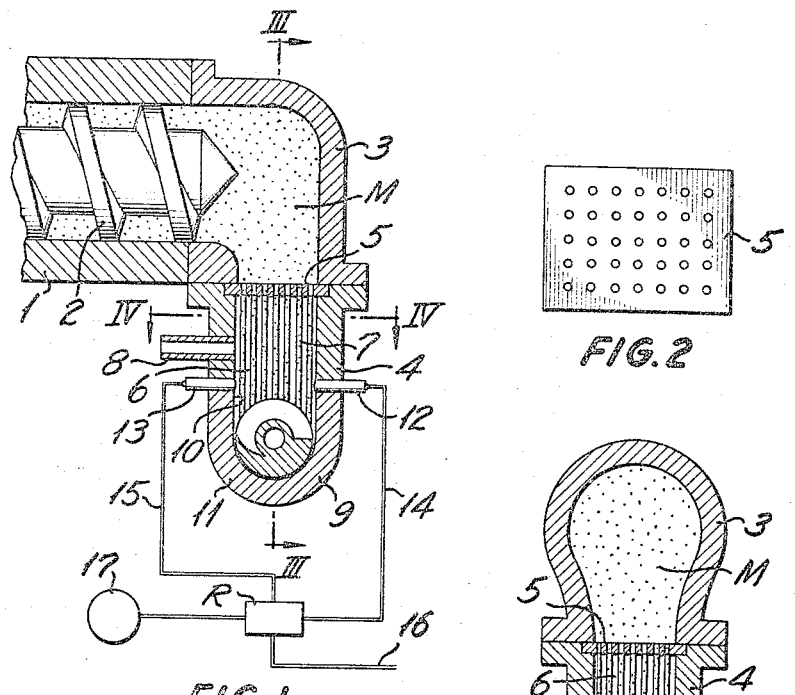
FIG. 1 is a view, in vertical section, of a screw extruder according to the invention, also showing its relation with an associated electric circuit which includes a photoelectric tube and relay.
Figure 2:
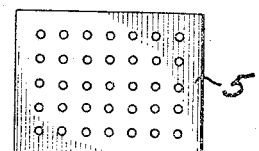
FIG. 2 is a plan view of the breaker plate of FIG. 1.
Figure 3:
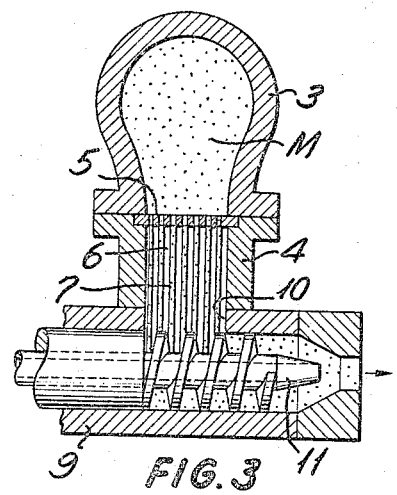
FIG. 3 is a sectional view taken along the line III—III of FIG. 1.
Figure 4:
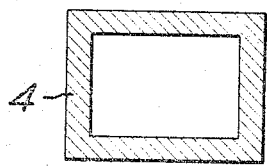
FIG. 4 is a sectional view taken along the line IV—IV of FIG. 1.
Figure 5:
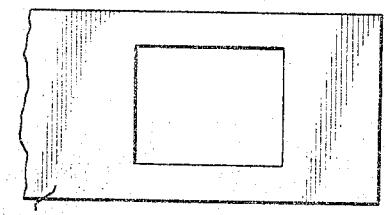
FIG. 5 is a plan view showing the geometry of the hopper adjacent the secondary cylinder.

Referring to FIG. 1, a first cylinder 1 has a first screw 2 in its bore and is connected through an elbow 3 with a vertical conduit 4. Material M fed into a hopper (not shown) is extruded by the first screw 2 from left to right as seen in FIGURE 1, forced through a breaker plate 5 into a hollow vertical passage 6 in the conduit 4, and broken into a large number of fine cords 7 with a substantial increase in the combined exposed area of the material. Then, the material in the form of fine cords passes through the passage 6. A secondary cylinder 9 is equipped with a secondary screw 11 therein. An inlet 10 on the secondary cylinder 9 has the same shape and dimensions as those of the conduit 4. The conduit 4 is connected with the secondary cylinder in gastight relation, and is provided with a pipe 8 for communication with a separate vacuum pump (not shown). Thus, if the passage 6 is subjected to a vacuum, gaseous or volatile matter such as air and moisture accompanying the material are thoroughly dissipated from the greatly increased surface of the fine cords 7 of material, and externally discharged through the pipe 8. The air and moisture as well as other fluid substances are introduced into the cylinder 1 together with the material, and kneaded and heated therewith in the cylinder. The fluid substances may also be contained in the material introduced in the cylinder.

The reason that the vent section is not provided midway of the cylinder but at the rearmost end is that the temperature of stock in the cylinder is raised gradually from the hopper toward the rear part of the cylinder, reaching a maximum at the rearmost end so that the viscosity of the material is a minimum at the end, and accordingly the fluid is most easily dissipated at this end.

According to the invention, therefore, all of the defects of the conventional systems are eliminated with the result that the venting effect may be increased to a great extent and that there is no possibility of reduction in output. Merely by lengthening the conduit 4 can the dwell time of the material inside the passage be prolonged to any desired extent, with a corresponding limitless increase in the venting effect. It is also possible to provide an inspection window (not shown) in the conduit 4 so that its interior can be visually observed from outside.

In this system, the secondary screw is driven at a varying speed in such a way that it can extrude a sufficient and suitable amount of degasified material coming from the passage therethrough. A varying speed rotary mechanism can be employed for this purpose and be of any known suitable type.

Figure 6:
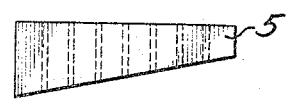
FIG. 6 is a front view of a modified breaker plate.
Figure 7:
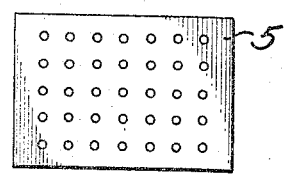
FIG. 7 is a plan view of the modified breaker plate of FIG. 6.

Considering the distribution of fine cords 7 of material M after passage of the material through the breaker plate 5, the pressure applied to the breaker plate by the material M being forced through the plate 5 by the screw 2 is such that it reaches a maximum value on the leftmost end of the plate and a minimum on the rightmost end, and hence the amount of the cords 7 passing therethrough is not uniform. For this reason, the thickness of the plate 5 is increased at the leftmost end and decreased at the rightmost end proportionally to the pressure to be applied, as shown in FIG. 6, so that uniform distribution of material flow can be ensured. The large number of minute holes to be provided on the breaker plate are not necessarily cylindrical, but may take the form of small slits thereby to extrude the material into a large number of thin ribbons for a further increase in the combined exposed area.

In carrying the system above described in practice, the following arrangements are made in order to automatize the extruding operation and enhance the efficiency.

As shown in FIG. 1, a photoelectric tube assembly consisting of a light projector 12 and a light receiver 13 is connected by conductors 14 and 15 to a relay R, which in turn is connected to a power source 16 and a motor 17.

When the conduit 4 is empty, the light beam and hence current passes uninterruptedly therethrough. If the material M is led into the conduit 4, the light beam is interrupted and the relay is energized to start a motor 17 for driving the vacuum pump. As the result, the passage 6 is subjected to a vacuum.

Subsequently by functions similar to the above, the motor for driving the secondary screw 11 is started and the screw begins running.

Since FIG. 1 is intended to illustrate the arrangement of the electric circuit relative to the extruder construction, the position where the motor is installed is not shown. Actually, however, the motor is located in a position where it can drive the secondary screw.

In addition to the conventional vent systems outlined above, another system has been proposed whereby a vent is provided on the hopper. The system is satisfactory in a sense, and yet is not deemed sufficient for venting purpose because it can discharge gas generated inside the cylinder close to the hopper but not the gas generated in the portion of cylinder remote from the hopper. Therefore, it is advisable to use the method in combination with the system according to the invention.

What is claimed is:
1. An improved apparatus for venting a screw extruder of the type having a first cylinder disposed horizontally and a first screw concentrically inserted in said cylinder for kneading material and discharging the same through a discharge outlet in the cylinder, the apparatus comprising a conduit extending downwardly from the discharge outlet of said cylinder, and defining a vertical passage for the material, a breaker plate between said cylinder and passage for dividing the material extruded by said first screw into a large number of fine cords which are dropped through the vertical passage, said breaker plate being tapered in thickness and having one side closer to said first screw which is of greatest thickness and an opposite side furthest from the screw of least thickness so that the amount of material passing through the breaker plate is uniformly distributed on the entire surface of said plate, a secondary extruder including a secondary cylinder disposed horizontally at right angles to said vertical passage and a secondary screw concentrically mounted in said secondary cylinder, said conduit being mounted in airtight relation on said secondary cylinder so that the material descending through said passage may enter the secondary cylinder and means on said conduit for communicating with a separate vacuum means located outside said conduit, whereby the vertical passage can be subjected to a vacuum and the material passing therethrough can be degassed.

2. An apparatus as claimed in claim 1, wherein said passage is rectangular in cross-section, said breaker plate being mounted at the inlet of said passage and having an effective area of the same size and shape as the inlet, said secondary cylinder having an inlet with the same size and shape as the outlet of the vertical passage.

3. An apparatus as claimed in claim 1, wherein said breaker plate is provided with a plurality of openings for dividing the material.

4. An apparatus as claimed in claim 1 comprising a control system constituted by an electric circuit including a photoelectric tube assembly and relay connected to said vertical passage that upon introduction of material into the passage the vacuum means and the secondary screw are automatically activated, whereas when the passage is empty they are deactivated.

References Cited

UNITED STATES PATENTS

| | | | |
|---|---|---|---|
| 1,898,381 | 2/1933 | Mooney | 264—102 |
| 1,987,358 | 1/1935 | Bonnot. | |
| 2,146,532 | 2/1939 | Crane et al. | 264—102 |
| 2,205,328 | 6/1940 | Wills | 25—11 |
| 2,524,999 | 10/1950 | Schulerud | 25—11 X |
| 3,067,462 | 12/1962 | Kullgren. | |

WILLIAM J. STEPHENSON, *Primary Examiner.*